(12) United States Patent
Battistello et al.

(10) Patent No.: US 8,406,223 B2
(45) Date of Patent: Mar. 26, 2013

(54) MECHANISM FOR PROTECTING H.323 NETWORKS FOR CALL SET-UP FUNCTIONS

(75) Inventors: Patrick Battistello, Perros-Guirec (FR); Stéphane Gorse, Trebeurden (FR)

(73) Assignee: France Telecom, Paris (FR)

( * ) Notice: Subject to any disclaimer, the term of this patent is extended or adjusted under 35 U.S.C. 154(b) by 1413 days.

(21) Appl. No.: 11/988,706

(22) PCT Filed: Jul. 3, 2006

(86) PCT No.: PCT/FR2006/050666
§ 371 (c)(1), (2), (4) Date: Jan. 11, 2008

(87) PCT Pub. No.: WO2007/006992
PCT Pub. Date: Jan. 18, 2007

(65) Prior Publication Data
US 2009/0080416 A1 Mar. 26, 2009

(30) Foreign Application Priority Data
Jul. 12, 2005 (FR) ..................... 05 52165

(51) Int. Cl.
*H04L 12/66* (2006.01)
*H04L 9/32* (2006.01)
*H04M 15/00* (2006.01)

(52) U.S. Cl. ............... 370/352; 379/142.05; 379/142.06; 713/168; 713/172

(58) Field of Classification Search ............... 379/142.05–142.06; 370/395.32, 370/450; 713/168, 172; 726/9
See application file for complete search history.

(56) References Cited

U.S. PATENT DOCUMENTS
6,324,271 B1 * 11/2001 Sawyer et al. ........... 379/142.05

OTHER PUBLICATIONS

"Telecommunications and Internet Protocol Harmonization over Networks (TIPHON); Open Settlement Protocol (OSP) for Inter-Domain pricing, authorization and usage exchange; ETSI TS 101 321", ETSI Standards, European Telecommunications Standards Institute, vol. TIPHON-3, No. v306, Oct. 2004.
"Telecommunications and Internet Protocol Harmonization over Networks (TIPHON) Release 4; Test Scenarios; Security testing—H.323 environment; ETSI TS 101 888", ETSI Standards, European Telecommunications Standards Institute, vol. TIPHON-6, No. V421, Dec. 2003.
"Telecommunications and Internet Protocol Harmonization over Networks (TIPHON) Release 4; Technology Mapping; Implementation of TIPHON architechture using H.323; ETSI TS 101 883", ETSI Standards, European Telecommunications Standards Institute, vol. TIPHON-3, No. V411, Dec. 2003.

* cited by examiner

*Primary Examiner* — Chandrahas Patel
*Assistant Examiner* — Joel Hamel
(74) *Attorney, Agent, or Firm* — Cozen O'Connor (57) ABSTRACT

In a network in which to set up a call to a called endpoint a calling endpoint sends (4) the called endpoint a call set-up message including a source information element identifying the calling endpoint and a destination information element identifying the called endpoint, the call is set up on condition that the call set-up message contains a first token value (J) that corresponds to a second token value given by an equation that includes said source information element, said destination information element, and a random information element generated by the network to be associated secretly with the first token value in the network.

12 Claims, 6 Drawing Sheets

MECHANISM FOR PROTECTING H.323 NETWORKS FOR CALL SET-UP FUNCTIONS

RELATED APPLICATIONS

This is a U.S. national stage of application No. PCT/FR2006/050666, filed on Jul. 3, 2006.

This application claims the priority of French patent application no. 05/52165 filed Jul. 12, 2005, the content of which is hereby incorporated by reference.

FIELD OF THE INVENTION

The field of the invention is that of equipments and architectures of networks based on ITU-T recommendations H.323 "Packet Based multimedia communications systems" and H.225 "Call Signaling protocols and media stream packetization for packet-based multimedia communication systems".

The invention relates more particularly to the security of networks that use the H.323 protocol and associated protocols, as much from the point of view of the operator as from that of the user. The control mechanisms defined in the H.323 series recommendations are insufficient to alleviate certain vulnerabilities that have been demonstrated in a laboratory environment.

BACKGROUND OF THE INVENTION

The network entities defined in the H.323 recommendation considered here are endpoints (EP) and gatekeepers (GK). Endpoints comprise terminals, gateways (GW), multipoint control units (MCU), or more generally any entity capable of generating or receiving calls and processing the associated information streams.

The procedures for admitting and setting up calls used in the networks and entities defined in the ITU-T H.323 and H.225 recommendations are particularly sensitive because they use signaling necessary for sending or receiving an audiovisual call.

The current versions of the standards governing the call admission and call set-up functions cover different call set-up models and different organic architectures.

Where call set-up models are concerned, the messages defined in the H.225 and H.323 recommendations are segmented into two functional groups: the Registration, Admission, and Status (RAS) group and the Call Signaling (CS) group. To each of these groups there corresponds a network communication channel. The messages concerned are:
a) For the RAS functions:
  Admission ReQuest (ARQ), Admission ConFirm (ACF), Admission ReJect (ARJ)
  Location ReQuest (LRQ), Location ConFirm (LCF), Location ReJect (LRJ)
b) For the CS functions:
  Setup.

The H.323 recommendation defines two main call set-up modes according to the routing of the messages of the CS group.

Figure 1:
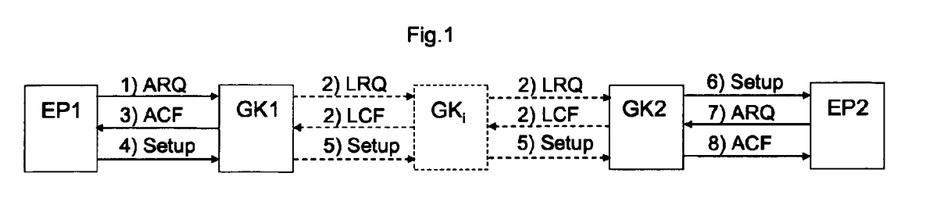
FIG. 1 is a diagram of call set-up in routed mode.

A first mode is the Gatekeeper Routed (GKR) mode. Referring to FIG. 1, to call an endpoint EP2, a calling endpoint EP1 sends (step 1) an ARQ message to a gatekeeper GK1 with which it is registered. The gatekeeper GK1 sends (step 2) LRQ messages to and receives LCF responses from the gatekeeper GK2 with which the endpoint EP2 is registered, possibly via other intermediate gatekeepers GK1. Following reception of the LCF response, GK1 sends (step 3) an ACF message to EP1. On reception of the ACF message, EP1 sends (step 4) a Setup message to GK1. The Setup message is then relayed (step 5) between the various gatekeepers until it reaches GK2, which forwards it (step 6) to EP2. On reception of the Setup message, EP2 initiates an admission phase (step 7) with the gatekeeper GK2 with which it is registered. The final phase (step 8) informs EP2 that it is authorized to accept the call.

Figure 2:
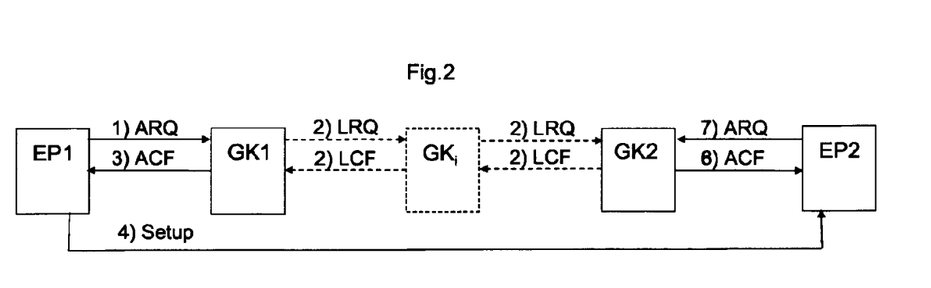
FIG. 2 is a diagram of call set-up in direct mode.

A second mode is the Direct (DIR) mode. Referring to FIG. 2, the first three phases (steps 1, 2, and 3) are identical to those of the GKR mode. The difference is in step 4 in which the Setup message is sent directly to the called endpoint EP2, which is made possible by the destination address information returned in step 3 in the ACF message. The last two phases (steps 7 and 8) are identical to steps 7 and 8 of the GKR mode.

In both the GKR mode and the DIR mode:
  The choice of the GKR or DIR mode is the responsibility of the gatekeeper and not of the endpoint. The endpoint can express a preference, however.
  The gatekeepers GK1 and GK2 can optionally be interconnected via other gatekeepers (GK1) according to the organic architecture. In the simplest case, EP1 and EP2 are registered with the same gatekeeper GK1 with the result that GK2 coincides with GK1.
  Sending LRQ messages is a dynamic mechanism for locating the destination gatekeeper; this mechanism is optional and can be replaced by management plane functions. Moreover, it is of use only if the two endpoints are not registered with the same gatekeeper.
  Although defined in the standard, the case where an endpoint is not registered with a gatekeeper is not taken into account because it does not correspond to an operational reality for the audiovisual services deployed at present.
  A third call set-up mode is defined in the standard: the hybrid mode. In hybrid mode, certain gatekeepers of the network apply the GKR mode while others apply the DIR mode. Because at least one network element is involved in call set-up, the hybrid mode is functionally similar to the GKR mode.

According to the architecture choices and operational constraints, the functions that process messages of the RAS group and those that process Setup messages can be distributed between diverse network elements or equipments. As this distribution potentially impacts on the security of the audiovisual service, three organic architectures are distinguished.

Figure 3:
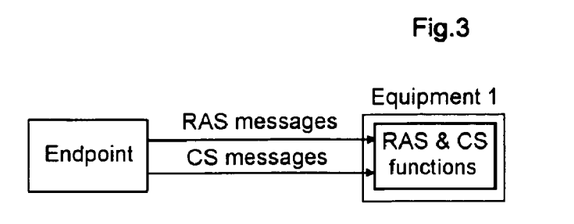
FIGS. 3 to 5 illustrate organic architectures for processing call set-up messages.

Referring to FIG. 3, in a first architecture AI the RAS and CS-processing functions are integrated into the same equipment 1 with the possibility of complete correlation between fields of RAS and/or CS messages. In this architecture, the equipment 1 is generally a gatekeeper GK.

Figure 4:
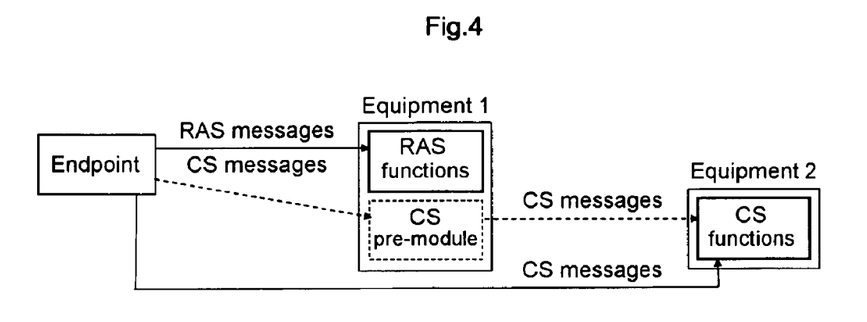

Referring to FIG. 4, in a second architecture AR the RAS processing functions are implemented in the equipment 1 and the CS processing functions are implemented in an equipment 2. CS messages are sent directly to the equipment 2 or optionally pass in transit via the equipment 1. When they pass in transit via the equipment 1, CS messages can optionally be processed by a CS pre-module in the equipment 1. That pre-module typically provides filtering, address translation, syntax verification or partial correlation with the RAS functions.

Figure 5:
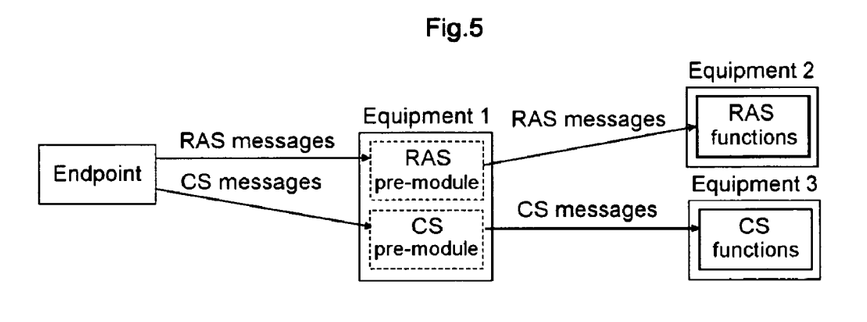

Referring to FIG. 5, in a third architecture AF the RAS processing functions are implemented in the equipment 2 and the CS processing functions are implemented in an equipment 3. The equipment 1 serves as a front-end vis-à-vis the endpoint by relaying RAS messages to the equipment 2 and CS messages to the equipment 3. Processing by an RAS pre-module or a CS pre-module can optionally be performed in the equipment 1, such as filtering, address translation, syntax verification or partial RAS/CS correlation. The main role of the equipment 1 is still to protect the equipments 2 and 3 by preventing direct access to them from the endpoint, i.e. the client.

Conforming with the H.323 and H.225 recommendations in their current state is insufficient to immunize H.323 networks at call set-up time against certain attacks seeking to misappropriate an identity and obtain free access to the service. These attacks have been demonstrated by the inventors in a laboratory environment on certain systems conforming to the recommendations from the security point of view.

Where identity theft is concerned, for a given subscriber to an audiovisual service, the attack consists in sending a call with the identity modified, typically by changing the call number assigned by the operator to another number, which may optionally be assigned to a third-party client. In addition to the integrity problem faced by the audiovisual service, this attack can also have consequences on billing if the attacker uses a source number that is the number of an existing client.

By way of illustration, two attack modes A1 and A2 may be mentioned. The A1 mode modifies the calling number in the ARQ message. This is possible in systems in which the RAS function does not correlate the fields [endpointIdentifier] and [srcInfo] of the ARQ message enabling an endpoint to use a caller number that does not correspond to their registration number. This misappropriated number must then be transferred by the attacker into the [sourceAddress] field of the Setup message. The A2 mode sends an ARQ message that is correct insofar as the [srcInfo] field is concerned and then changes this number to a misappropriated number during sending of the Setup message, since this message is the basis for call set-up. This attack is possible if the CS function does not correlate the [sourceAddress] field of the Setup message with the [srcInfo] field of the ARQ message. Although easier to implement in the AR and AF architectures, this attack is also encountered in the AI architecture.

With regard to free access to the service, for an Internet user who does not subscribe to an audiovisual service, the attack sends a call on the network of the operator without being billed for that call. If successful in this, the attacker can generally use any caller number, which can be either an unassigned number or a number assigned to a regular client. This attack generates a loss of revenue for the operator and poses a billing problem if it uses a calling number that has already been assigned.

By way of illustration, two modes A3 and A4 of this attack may be mentioned. In the A3 mode, an attacker sends a Setup message directly to the CS function of the network that is responsible for call set-up. This is the simplest case and generally enables the attacker to set the caller number and the called number to any value. This attack assumes that the CS function does not verify if a previous ARQ message has been sent and that the Internet user actually has the right to send a Setup message. Although easy to implement in the AR and AF architectures, this attack is also encountered in the AI architecture. In the A4 mode, the attacker sends a Setup message following an ARQ/ACF exchange initiated by a corrupted client, i.e. a client that subscribes to the service but collaborates with one or more attackers. Thus the corrupted client sends an ARQ message and then, on reception of the ACF message, forwards to the attacker the information necessary for the attacker to be able to send the Setup message. The network correlates the Setup message with the ARQ message as belonging to the same dialogue, whereas these messages come from two different entities. Moreover the Setup message can contain a misappropriated calling number with the same consequences already referred to. Although easier to implement in the AF architecture, this attack is also encountered in the AR and AI architectures.

There are five main known protection mechanisms, called M1 to M5 below, for combating attacks of type A1 to A4.

The mechanism M1 uses a firewall which, placed on the upstream side of the equipments providing the H.323 RAS and CS functions, primarily filters packets on the basis of information on addresses and ports. In certain cases, this mechanism applies state filtering to H.323 messages, for example authorizing a Setup message only if it is preceded by an ARQ/ACF exchange. This mechanism therefore counters the A3 type of direct attack, but is generally ineffective against more sophisticated attacks that exploit the insufficient correlation between certain fields of ARQ and Setup messages.

The mechanism M2 is based on using dynamic ports. The attack A3 often being made possible by the use of a fixed listening port (usually the port 1720) for the CS function of the network, the idea here is to use a different port that can be more dynamic. That new port is communicated to the regular clients via the ACF message, which assumes that those terminals are registered for the service, unlike an illegitimate Internet user, who would send the Setup message directly to the port 1720 of the H.323 CS equipment. This mechanism is effective against the A3 attack but ineffective against more sophisticated attacks. Moreover, it is easy for a corrupted client to send the new value of the port used to one or more attackers, even if that port is dynamic and changes frequently.

The mechanism M3 analyses the degree of correlation between ARQ and Setup messages. The idea is to verify strictly certain fields detected as sensitive within ARQ and Setup messages. A first level of rules verifies intramessage (ARQ and Setup) fields while a second level of rules verifies intermessage (between ARQ and Setup) fields. Thus patent application FR05/02110 proposes improvements to the standard on the security plane by proposing verification rules for ARQ and Setup messages.

Those rules combat attacks A1 to A4 in the context of an AI architecture. However, they are not easy to implement in the AR and AF architectures, in which the RAS and CS functions of the network are not co-located, which makes the intermessage verification level much more complex.

The M4 mechanism is based on a witness token that consists essentially in an information element sent and/or relayed between entities. According to this mechanism, the RAS entity that receives the ARQ message associates with the ACF message a random token that has a limited validity period and then verifies that the endpoint regenerates this token correctly in the Setup message. This mechanism is beneficial for combating the A3 attack. However, in the present state of the art, it has a substantial weakness, namely enabling a corrupted client to communicate this token to one or more attackers who will intrinsically gain the right to send Setup messages. Moreover, this token being generally random, or even fixed, in the prior art, it is not satisfactory for making the correlation between the sensitive fields shown up in the mechanism M3.

The mechanism M5 uses an authentication process. Sensitive messages such as ARQ and Setup messages must include authentication of the client. There are many and varied authentication processes, generally based on an identifier and a password specific to each client. The operational drawback of this mechanism is that implementing it requires authentication servers. Moreover, this mechanism gives rise to the problem of having to be able to support an increase in the load if the number of clients is high. In practice, and for performance reasons, it is difficult if not impossible to authenticate all messages. Another drawback, of a more theoretical kind, is that authentication is not linked to the sensitive parameters of the messages, and so it is always possible, even for an authenticated client, to modify certain parameters of the dialogue and thereby create vulnerabilities in the network. Finally, a corrupted client divulging its authentication parameters to Internet users who do not subscribe to the service, in an extension of the A4 attack, could be imagined.

SUMMARY OF THE INVENTION

A first objective of the invention is to combat type A1 to A4 attacks by protecting the parameters of the dialogue prior to call set-up against fraudulent modifications and monitoring a high state of correlation between the messages sent in the context of call set-up.

A second objective of the invention is to be as applicable to AR and AF architectures as to AI architectures, i.e. to make correlation between ARQ and Setup messages possible even if the RAS and CS functions are organically separate.

A third objective of the invention is to be equally applicable to the GKR call set-up mode as to the DIR call set-up mode or a combination of these two modes.

A first aspect of the invention is a method of securing a network in which, to set-up a call to a called endpoint, a calling endpoint sends a call set-up message comprising a source information element and a destination information element each having a signaling value that identifies the calling endpoint and the called endpoint, respectively. The method is noteworthy in that the network sets up said call on condition that said signaling values correspond to admission values previously made known to the network.

In particular, said admission values previously made known to the network are contained in a token and the network verifies that a first token value sent in the call set-up message corresponds to a second token value given by an equation that includes said source information element and destination information element signaling values and a random information element generated by the network to be associated secretly in the network with the first token value.

In an H.323 type network, the first token value is advantageously calculated by a registration, admission, and status functional group in the calling end network by means of said equation if said functional group receives from a sending endpoint an admission request message containing a source information element identifying said sending endpoint and a destination information element. Said functional group then sends the sending endpoint an admission confirmation message containing said first token value.

More particularly in routed mode, a call signaling functional group in the network receives the call set-up message, verifies that the set-up message contains the first token value and looks for the random information element associated with said first token value, and, if successful, calculates the second token value by means of said equation to verify that said first token value is equal to said second token value.

More particularly in direct mode, a registration, admission, and status functional group in the called end network receives from the called endpoint an admission request message containing a source information element and a destination information element identifying the called endpoint, verifies that the admission request message contains the first token value and looks for the random information element associated with said first token value, and, if successful, calculates the second token value by means of said equation to send an admission confirmation message to the called endpoint on condition that said first token value is equal to said second token value.

Positive verification of a match between the first and second token values has the effect of destroying an association between the random information element and the first token value, so it is certain that the token will not be used again for a fraudulent attempt.

A second aspect of the invention is a gatekeeper of a network in which to set up a call to a called endpoint a calling endpoint sends a call set-up message including a source information element and a destination information element each having a signaling value that identifies the calling endpoint and the called endpoint, respectively. The gatekeeper is noteworthy in that it includes means for setting up said call on condition that said signaling values correspond to admission values previously made known to the network.

In particular the gatekeeper includes means for verifying that a first token value sent in the call set-up message matches a second token value given by an equation that includes said source information element and said destination information element signaling values and a random information element generated by the network to be associated secretly in the network with the first token value.

An H.323 type gatekeeper advantageously includes a registration, admission, and status functional group adapted to receive an admission request message from a sender endpoint, to extract from said request message a destination information element and a source information element identifying said sender endpoint, to calculate said first token value by means of said equation, and to send the sender endpoint an admission confirmation message containing said first token value.

More particularly to implement the routed mode, the same gatekeeper or another gatekeeper includes a call signaling functional group adapted to receive the call set-up message, to verify that the set-up message contains the first token value and to look for the random information element associated with said first token value, if successful to calculate the second token value by means of said equation, and to verify that said first token value is equal to said second token value.

More particularly to implement the direct mode, one of the above gatekeepers or another gatekeeper includes a registration, admission, and status functional group adapted to receive from the called endpoint an admission request message including a source information element and a destination information element identifying the called endpoint, to verify that the admission request message contains the first token value and to look for the random information element associated with said first token value to calculate, if successful, the second token value by means of said equation, and to send an admission confirmation message to the called endpoint on condition that said first token value is equal to said second token value.

A gatekeeper is adapted to destroy an association between the random information element and the first token value after positive verification of a match between the first and second token values, so a gatekeeper opposes multiple use of the same first token value.

DETAILED DESCRIPTION OF THE DRAWINGS

By way of preliminaries, there follows a summary of the semantics of various message fields, designated by their labels as used in the H.323 and H.225 recommendations, that are useful for a better understanding of the invention.

The fields of the ARQ message to which the process refers, their notation and their standard status are as follows:

source address (ASA): sending address of the ARQ message, in the transport network address sense. The format of this parameter depends only on the packet network used to interconnect the H.323 entities and is independent of the invention. Status of this field: mandatory srcInfo (SIA): one or more aliases designating the calling endpoint. These aliases can be a telephone number, an e164 identifier, an H.323 identifier, a e-mail address, etc. The type of alias used does not impact on the process described. Status of this field: mandatory srcCallSignalAddress (SCA): transport network address for the CS (Call Signaling) channel of the calling endpoint. Status of this field: optional destinationInfo (DIA): one or more aliases designating the called endpoint, to the same format as the SIA field. Status of this field: optional if DCA present destCallSignalAddress (DCA): transport network address for the CS (Call Signaling) channel of the called endpoint. Status of the field: optional if DIA present The fields of the Setup message to which the process refers, their notation and their standard status are as follows:

source address (ASS): appended to the ASA field for the Setup message. Status of this field: mandatory sourceAddress (SAS): appended to the SIA field for the Setup message. Status of this field: optional if SCS present srcCallSignalAddress (SCS): appended to the SCA field for the Setup message. Status of this field: optional if SAS present destinationAddress (DAS): appended to the DIA field for the Setup message. Status of this field: optional if DCS present destCallSignalAddress (DCS): appended to the DCA field for the Setup message. Status of this field: optional if DAS present The Setup message also includes two optional fields in its header, Called Party Number and Calling Party Number, which repeat the information from the SAS and DAS fields.

To verify the correlation at the input of the H.323 network between a Setup message sent by an endpoint and an ARQ message previously sent by the same endpoint, a method according to the invention uses a token mechanism incorporating information from the ARQ and Setup messages that is sensitive from the security point of view.

Figure 6:
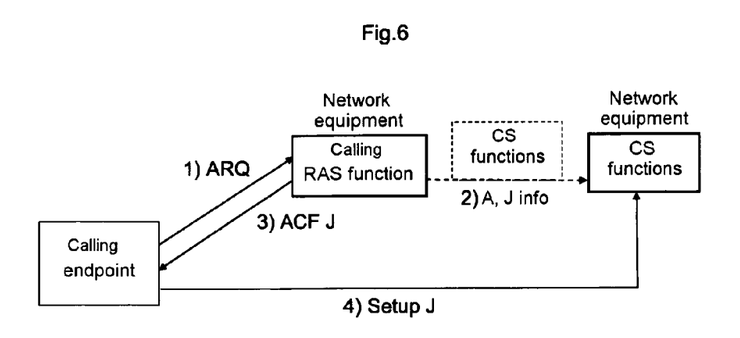
FIG. 6 is a diagram showing implementation of a method according to the invention in routed mode.

The FIG. 6 diagram is used to describe in detail the token mechanism in GKR mode as disclosed with reference to FIG. 1. When the RAS function receives an ARQ message (step 1) in the calling end network equipment, the RAS function verifies firstly if this request is acceptable or not therein. That verification is based on the call admission principles of the H.323 and H.225 recommendations and advantageously on additional consistency rules for ARQ messages such as those defined in the patent application FR 05 02110. If the result of the verification is positive, the calling end RAS function generates a token J on the basis of a random information element A, a source information element IS, and a destination information element ID. The elements IS and ID are derived from the ARQ message. In step 2, the calling end RAS function transfers the elements A and J to the first CS function resident in the network equipment responsible for subsequently receiving the Setup message. In step 3, the calling end RAS function sends back an ACF message containing the token J to the calling endpoint which, in step 4, sends a Setup message plus the token J. In the GKR mode, the Setup message is sent to the first CS function responsible for the call router. According to the H.323 recommendation, the transport address to which the Setup message must be sent is determined by the network elements and indicated to the calling terminal in the content of the ACF message. In the GKR mode, the validity of the Setup message with reference to the token J is verified by the first CS function.

Figure 7:
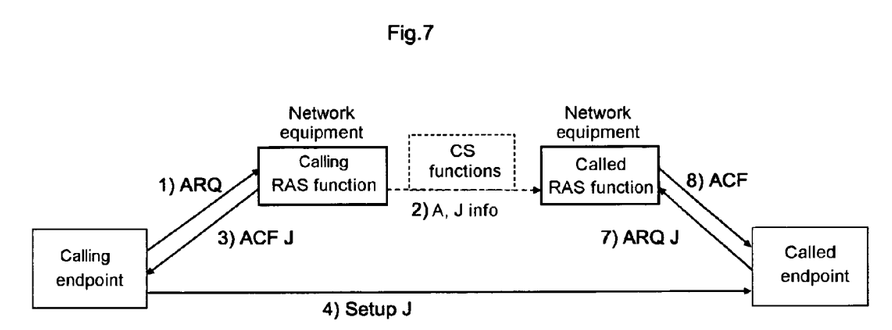
FIG. 7 is a diagram showing implementation of a method according to the invention in direct mode.

The FIG. 7 diagram is used to describe in detail the token mechanism in DIR mode such as disclosed with reference to FIG. 2. If the RAS function receives an ARQ message (step 1) in the calling end network equipment, the RAS function verifies firstly if this request is acceptable or not therein in a similar way to the GKR mode. In step 2, the calling end RAS function transfers the elements A and J to the RAS function resident in the called end network equipment. In step 3, the calling end RAS function sends back an ACF message containing the token J to the calling endpoint which, in step 4, sends a Setup message plus the token J. In the DIR mode the Setup message is sent directly to the called terminal. According to the H.323 recommendation, the transport address to which the Setup message must be sent is determined by the network elements and indicated to the calling terminal in the content of the ACF message. In the DIR mode, the called endpoint sends the called end network equipment an ARQ message (step 7) based on the information from the Setup message and containing the token J. The ARQ message is verified by the called end RAS function, which generates an ACF message (step 8) to accept the call if the result of the verification is positive.

The information element A is a random number that can be numerical or alphanumerical and of any length. This element is applied to one and only one token and is generated at random for each new token calculation.

A set-up value of the information element IS is determined from the ARQ message received by the calling end RAS function from the equation:

$$IS = SIA + ASA + SCA$$

in which the symbol '+' designates the concatenation operator and the abbreviations SIA, ASA, and SCA have the meanings defined above. The ASA and SCA fields refer only to the network address and not to the associated port. If the SCA field is not included in the ARQ message, it takes the value 'empty' in the above equation.

A set-up value of the information element ID is determined from the ARQ message received by the calling end RAS function from the equation:

$$ID = DIA + DCA$$

in which the sign '+' designates the concatenation operator, and the abbreviations DIA and DCA have the meanings defined above. The DCA field refers only to the network address and not to the associated port. The fields DIA and DCA being mutually optional, if one of them is not included in the ARQ message it takes the value 'empty' in the preceding equation.

The token J is generated by the calling end RAS function and its value is given by the equation:

$$J=\text{hash}(A+IS+ID)$$

in which the sign '+' designates the concatenation operator and 'hash' designates a hashing function, for example the known MD5 algorithm, which returns a character stream of fixed size. Although the information element A is random, the elements IS and ID depend only on the call in progress.

The token J and the information element A are transferred by the calling end RAS function to the entity responsible for the verification function. This destination entity can be a CS function ("GKR" mode) or the called end RAS function ("DIR" mode). Note that the called end RAS function can coincide with the calling end RAS function if the calling and called endpoints are registered with the same gatekeeper and call set-up is direct ("DIR" mode).

Two main modes may be envisaged for transferring A and J:

Internal mode: A and J are transferred via a memory or communication bus internal to the equipment. This process is possible only for AI architectures and if the calling and call endpoints are registered with the same gatekeeper.

Message mode: A and J are transferred via an H.323 or proprietary type signaling message. The LRQ message is advantageously chosen, because it is used nominally between H.323 entities to locate the called endpoint and determine the transport address to which the Setup message must be sent. The message mode can be applied to all situations.

The entity receiving A and J is responsible for storing it in a token base and for then deleting the corresponding registration if one of the following two rules is satisfied:

Utilization: A and J have been extracted from the base for verification purposes, following reception of a Setup or ARQ message having a token of the same value as J. This rule applies if the verification result is positive. It is preferable not to destroy the token in the event of a negative verification result in order not to prevent an authorized endpoint making use of the token.

Expiration: A and J have not been used at the end of a storage time defined by the operator. The storage time is typically equal to the maximum period between receiving the ARQ message and receiving the associated Setup message.

The first condition typically prevents replay attacks by guaranteeing that a token can be used once and once only and the second condition prevents attacks by saturation of resources that store a large number of tokens in the system "indefinitely".

In the GKR mode, the CS function of the network entity that receives the Setup message sent by the calling endpoint extracts the token J from this message and looks for a match with a token of the same value stored in its token base. If a match is found, the entity recovers the information element A associated with the token in the base, and if not the token is considered invalid and the call is rejected.

A source information element signaling value $IS_R$ and a destination information element signaling value $ID_R$ are determined from the Setup message.

After recovering the information element A, the function CS calculates a new token $J_R$ from the equation:

$$(J_R)=\text{hash}(A+IS_R+ID_R) \text{ where:}$$

'+' is the concatenation operator;

'hash' is the same hashing function as used at the caller end;

$IS_R$=ASS+SAS+SCS (according to the above definitions);

$ID_R$=DAS+DCS (according to the above definitions).

If the token $J_R$ is equal to the token J, then call set-up can continue; if not, the Setup message is considered invalid and the call is rejected.

Notes:

The fields ASS, SCS, and DCS refer only to the network addresses and not to the associated ports.

The fields filled in by the calling endpoint must be homogeneous between the messages ARQ and Setup. Thus SAS must appear in the Setup message because SIA is mandatory in the ARQ message, the fields SCS and SCA must be simultaneously absent or present, likewise the pairs of fields (DAS, DIA) and (DCS, DCA).

The transport address or called party identifier or calling party identifier address fields must have the same format between the ARQ and Setup messages. This is also the responsibility of the calling endpoint.

If the header of the Setup message includes the [Calling Party Number] and [Called Party Number] fields they can advantageously be correlated with the values of the fields SAS and DAS, if present.

In DIR mode, on receipt of the Setup message, the called endpoint sends an ARQ message (step 7) to the RAS entity with which it is registered with the following fields:

SIA=caller identifier contained in the Setup message

SCA=source address of the Setup message

DIA=its own call identifier

DCA=its own transport address for the CS channel

J=the token value contained in the Setup message

On receipt of the ARQ message (step 7), the called end RAS function looks for a match between the token J received and a token of the same value stored in its base.

A source information element signaling value $IS_R$ and a destination information element signaling value $ID_R$ are determined from the ARQ message (step 7).

When found, the match enables the RAS function to extract the value A associated with the token in the base to calculate a new token $J_R$ from the equation:

$$(J_R)=\text{hash}(A+IS_R+ID_R) \text{ where:}$$

'+' is the concatenation operator;

'hash' is the same hashing function as used at the calling end;

$IS_R$=SIA+SCA (with SIA and SCA as defined above);

$ID_R$=DIA+DCA (with DIA and DCA as defined above).

If the token $J_R$ is equal to the token J, then call set-up can continue and an ACF message is sent to the called party (step 8); if not, call set-up fails and an ARJ message is sent to the called party.

Notes:

The fields SCA and DCA refer only to the network addresses and not to the associated ports.

The fields sent by the called party in the ARQ message (step 7) must be similar to and have the same format as those sent by the calling party in the ARQ message (step 1). Accordingly the DIA field must be simultaneously present or simultaneously absent in these two message, likewise the DCA field.

For the information element $IS_R$ to be equal to IS, it is obligatory for the calling party not to fill in the SCA field in the ARQ message that it sends in the "DIR" call mode (step 1).

The mechanism described in the above paragraphs, starting from a valid ARQ message, communicates to the corresponding CS function call identification elements IS and ID enabling it to validate the expected Setup message.

Instead of using a token principle that gives a signature of the elements IS, ID and a random element A, an alternative mechanism transfers the information IS and ID directly to the CS function, which is assumed to have received the Setup message. In this case, it is no longer necessary to transfer the token J in the ACF message (step 3), the Setup message (step 4) and the ARQ message (step 7).

However, this alternative has the drawback that, for any Setup message received (step 4), it is necessary to recalculate the elements $IS_R$ and $ID_R$ before looking up this pair in the calls waiting base. This is reflected in increased consumption of resources in the receiving CS function and of the possibility of DOS (Denial Of Service) attacks through saturation of resources. Conversely, the token J offers effective indexing means to reduce this kind of attack.

The mechanism described in the above paragraphs can easily be transposed to verifying Setup messages exchanged between gatekeepers in the case of interdomain call set-up. Broadly speaking, the gatekeeper that sends the Setup message calculates a token J associated with that Setup message and transfers A and J to the gatekeeper, which is assumed to have received the Setup message.

As before, this information can be transferred via a proprietary mechanism or advantageously using an H.323 signaling message such as the LRQ message. The gatekeeper receiving the Setup message extracts the token J that it contains and if the token J is present in its token base it proceeds with verification, as described above, to determine if it can accept the Setup message.

The following examples illustrate call set-up attempts in valid cases with reference to FIGS. 8 to 15 and in fraudulent cases with reference to FIGS. 16 to 19. Although not exhaustive, they sketch in the most frequent situations at the operational level. They cover the AI, AR and AF architectures and the "GKR" and "DIR" modes. Only the dialogue portion relating to the verification process is described, together with the values of the corresponding message elements. For simplicity, it is assumed in all the examples that the information element A is fixed and equal to '9090'.

Figure 8:
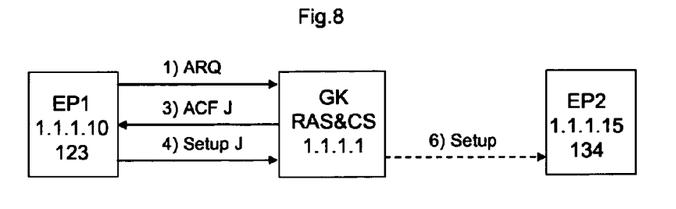
FIGS. 8 to 15 show examples of call set-up detected as valid by the method according to the invention.

FIG. 8 shows a valid call in GKR mode in an AI architecture in which the endpoints are on the same GK.

Details:
1) ARQ: ASA='1.1.1.10', SIA='123', SCA='1.1.1.10', DIA='134', DCA=' '
  calculate: J=hash (A+SIA+ASA+SCA+DIA+DCA)=hash ('9090'+'123'+'1.1.1.10'+'1.1.1.10'+'134')
3) ACF: [destCallSignalAddress]='1.1.1.1', J
4) Setup: ASS='1.1.1.10', SAS='123', SCS='1.1.1.10', DAS='134', DCS=' ', J
  verify that J is registered and recover value A
  calculate $J_R$=hash (A+SAS+ASS+SCS+DAS+DCS)=hash ('9090'+'123'+'1.1.1.10'+'1.1.1.10'+'134')
  verify $J_R$=J, therefore send Setup message to called party (step 6)

Figure 9:
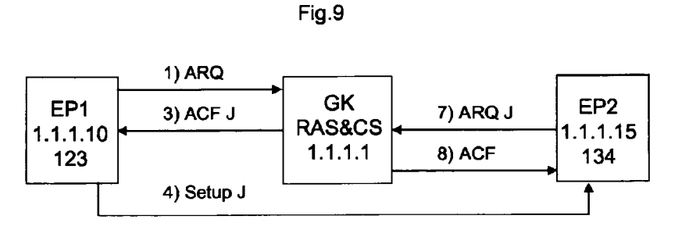

FIG. 9 shows a valid call in DIR mode in an AI architecture in which the endpoints are on the same GK.

Details:
1) ARQ: ASA='1.1.1.10', SIA='123', SCA=' ', DIA='134', DCA=' '
  calculate: J=hash (A+SIA+ASA+SCA+DIA+DCA) hash ('9090'+'123'+'1.1.1.10'+'134')
3) ACF: [destCallSignalAddress]='1.1.1.15', J
4) Setup: ASS='1.1.1.10', SAS='123', SCS='1.1.1.10', DAS='134', DCS=' ', J
7) ARQ: ASA='1.1.1.15', SIA='123', SCA='1.1.1.10', DIA='134', DCA=' ', J
  verify that J is registered and recover value A
  calculate: $J_R$=hash (A+SIA+SCA+DIA+DCA)=hash ('9090'+'123'+'1.1.1.10'+'134')
  verify $J_R$=J, therefore send ACF to called party (step 8)
Note that:
  in "DIR" mode, the ARQ message (step 1) must not contain any SCA parameter in order for it to be possible to compare the two tokens;
  whether filled in or not, the SCS field of the Setup message (step 4) is not transferred into the ARQ message (step 7), although it is important to correlate its value to the source address of the Setup message;
  in this second example, the calling party does not use the DCA field of the ARQ message, so the called party must also not use it if comparing the tokens is to make sense.

Figure 10:
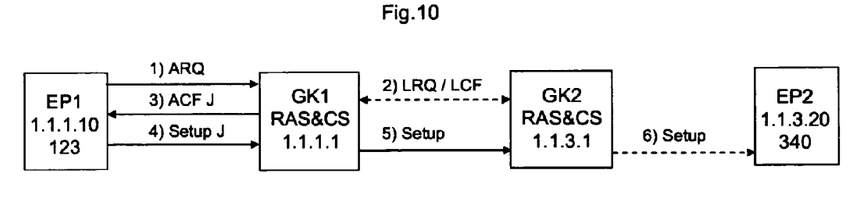

FIG. 10 shows a valid call in GKR mode in an AI architecture in which the endpoints are on two different GK.

Details:
1) ARQ: ASA='1.1.1.10', SIA='123', SCA='1.1.1.10', DIA='340', DCA=' '
  calculate: J=hash (A+SIA+ASA+SCA+DIA+DCA)=hash ('9090'+'123'+'1.1.1.10'+'1.1.1.10'+'340')
3) ACF: [destCallSignalAddress]='1.1.1.1', (J)
4) Setup: ASS='1.1.1.10', SAS='123', SCS='1.1.1.10', DAS='340', DCS=' ', J
  verify by GK1 that J is registered and recover value A
  calculation by GK1 of $J_R$=hash (A+SAS+ASS+SCS+DAS+DCS)=hash ('9090'+'123'+'1.1.1.10'+'1.1.1.10'+'340')
  verify that $J_R$=J, therefore send Setup to GK2 (step 5)
Note that GK1 can where appropriate initiate an LRQ/LCF exchange with GK2 (step 2) to locate the called endpoint.

Figure 11:
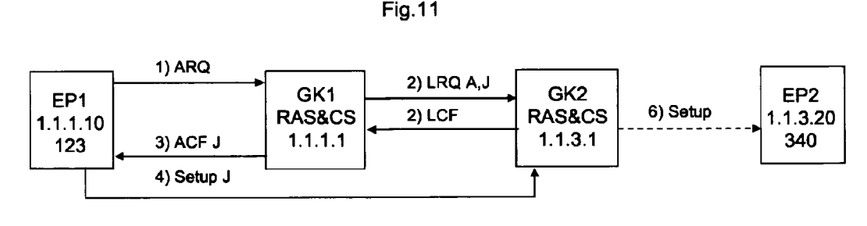

FIG. 11 shows a valid call in GKR mode in an AI architecture in which the endpoints are on two separate gatekeepers and the caller end gatekeeper GK1 decides not to route the call.

Details:
1) ARQ: ASA='1.1.1.10', SIA='123', SCA=' ', DIA='340', DCA=' '
  calculation by GK1: J=hash (A+SIA+ASA+SCA+DIA+DCA)=hash ('9090'+'123'+'1.1.1.10'+'340')
2) LRQ: [destinationInfo]='340', (A, J)
2) LCF: [callSignalAddress]='1.1.3.1'
3) ACF: [destCallSignalAddress]='1.1.3.1', (J)
4) Setup: ASS='1.1.1.10', SAS='123', SCS=' ', DAS='340', DCS=' ', (J)
  verify by GK2 that (J) is registered and recover value (A)
  calculate by GK2: $J_R$=hash (A+SAS+ASS+SCS+DAS+DCS) hash ('9090'+'123'+'1.1.1.10'+'340')
  verify by GK2 that $J_R$=J, therefore send Setup to called party (step 6).
Note that:
  it is necessary to send the LRQ message because the number "340" is not stored in GK1 and this message conveys A and J. Any other message having the same function is acceptable;
  in the LCF message, GK2 gives its own address because it decides to route the call;
  as at least one of the gatekeepers GK1 or GK2 has decide to route the call, the resulting mode is "GKR", although GK1 is in direct mode.

Figure 12:
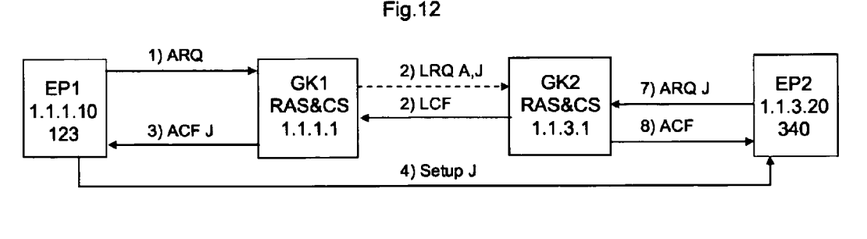

FIG. 12 shows a valid call in DIR mode in an AI architecture in which the endpoints are on two different gatekeepers.

Details:
1) ARQ: ASA='1.1.1.10', SIA='123', SCA=' ', DIA='340', DCA=' '
   calculate by GK1: J=hash (A+SIA+ASA+SCA+DIA+DCA)=hash ('9090'+'123'+'1.1.1.10'+'340')
2) LRQ: [destinationInfo]='340', (A, J)
2) LCF: [callSignalAddress]='1.1.3.20'
3) ACF: [destCallSignalAddress]='1.1.3.20', (J)
4) Setup: ASS='1.1.1.10', SAS='123', SCS=' ', DAS='340', DCS=' ', (J)
7) ARQ: ASA='1.1.3.20', SIA='123', SCA='1.1.1.10', DIA='340', DCA=' ', (J)
   verify by GK2 that J is registered, and recover value A;
   calculate by GK2: $J_R$=hash (A+SIA+SCA+DIA+DCA) =hash ('9090'+'123'+'1.1.1.10'+'340')
   verify $J_R$=J, therefore send ACF to called party (step 8).
   Note that:
   in "DIR" mode, the SCA parameter of the calling ARQ must not be filled in;
   as the DCA parameter is not filled in in the calling ARQ it must not be filled in the called ARQ either.

Figure 13:
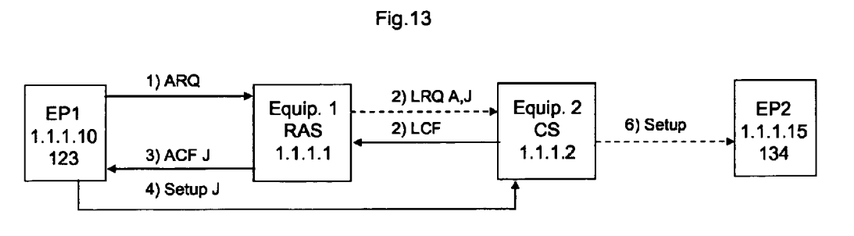

FIG. 13 shows a valid call in GKR mode in an AR architecture in which the endpoints are on the same gatekeeper with distribution of the RAS and CS functions to an equipment Equip.1 and an equipment Equip.2, respectively.

Details:
1) ARQ: ASA='1.1.1.10', SIA='123', SCA='1.1.1.10', DIA='134', DCA=' '
   calculate by Equip.1: J=hash (A+SIA+ASA+SCA+DIA+DCA)=hash ('9090'+'123'+'1.1.1.10'+'1.1.1.10'+'134')
2) LRQ: [destinationInfo]='134', (A, J)
2) LCF: [callSignalAddress]='1.1.1.2'
3) ACF: [destCallSignalAddress]='1.1.1.2', J
4) Setup: ASS='1.1.1.10', SAS='123', SCS='1.1.1.10', DAS='134', DCS=' ', (J)
   verify by equipment Equip.2 that J is registered and recover value A;
   calculate by Equip.2: $J_R$=hash (A+SAS+ASS+SCS+DAS+DCS)=hash ('9090'+'123'+'1.1.1.10'+'1.1.1.10'+'134')
   verify $J_R$=J, therefore send Setup to called party (step 6)
   Note that if the called endpoint is not stored on the same GK as the caller, the equipment Equip.2 relays the call to the next entity, which amounts to modifying the destination of the Setup message.

Figure 14:
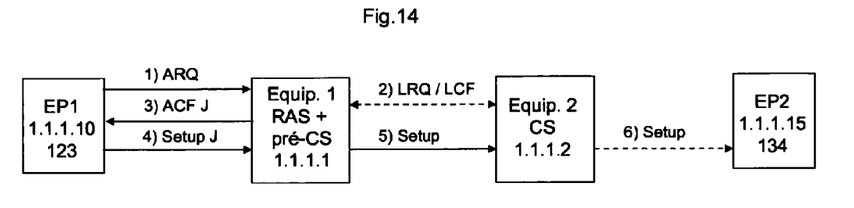

FIG. 14 shows a valid call in GKR mode in an AR architecture in which the endpoints are on the same gatekeeper with distribution of the RAS and CS functions to an equipment Equip.1 and an equipment Equip.2, respectively. The difference is that the equipment 1 executes CS pre-functions, in particular verifying the token and relaying the Setup message that is no longer sent directly to the equipment 2.

Details:
1) ARQ: ASA='1.1.1.10', SIA='123', SCA='1.1.1.10', DIA='134', DCA='1.1.1.1'
   calculate by Equip.1: J=hash (A+SIA+ASA+SCA+DIA+DCA)=hash ('9090'+'123'+'1.1.1.10'+'1.1.1.10'+'134'+'1.1.1.1')
3) ACF: [destCallSignalAddress]='1.1.1.1', (J)
4) Setup: ASS='1.1.1.10', SAS='123', SCS='1.1.1.10', DAS='134', DCS='1.1.1.1', J
   verify by Equip.1 that J is registered and recover value A;
   calculate $J_R$=hash (A+SAS+ASS+SCS+DAS+DCS)=hash ('9090'+'123'+'1.1.1.10'+'1.1.1.10'+'134'+'1.1.1.1')
   verify $J_R$=J, therefore progress to next step 5) Setup: ASS='1.1.1.1', SAS='123', SCS='1.1.1.1', DAS='134', DCS='1.1.1.2'
   Equip.2 verifies location of addressee and sends Setup (step 6)
   Note that:
   the sending of the ACF message (step 3) by the equipment 1 can be preceded by an LRQ/LCF phase during which equipment 1 verifies that equipment 2 is ready to receive the Setup message;
   in contrast to the FIG. 13 example, here the token is verified by equipment 1, and not by equipment 2, which explains why the Setup message (step 5) does not contain the token J;
   the phase of sending the Setup message (step 6) is normally extended by an ARQ/ACF exchange between EP2 and equipment 1 (this phase is not represented here because it the process ignores it);
   if the called terminal is not located in the same area as the equipment 1, the extension of call set-up is the responsibility of equipment 2.

Figure 15:
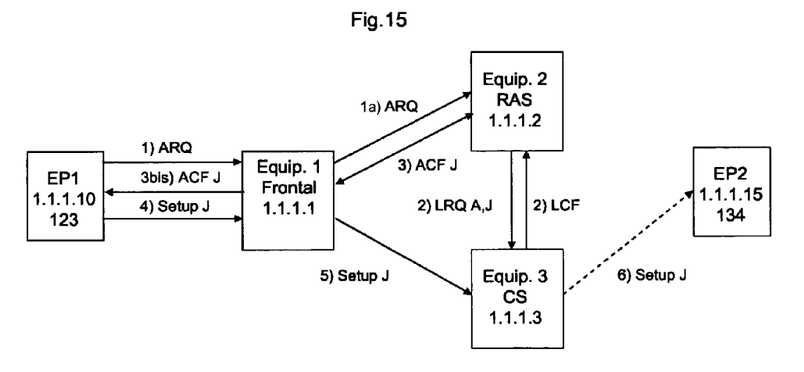

FIG. 15 shows a valid call in GKR mode in an AF architecture in which the endpoints are stored on the same gatekeeper with a front-end equipment Equip.1 and distribution of the RAS and CS functions to an equipment Equip.2 and an equipment Equip.3, respectively.

Details:
1) ARQ: ASA='1.1.1.10', SIA='123', SCA='1.1.1.10', DIA='134', DCA='1.1.1.1'
   1a) ARQ: ASA='1.1.1.1', SIA='123', SCA='1.1.1.1', DIA='134', DCA=' '
   calculate by Equip.2: J=hash (A+SIA+ASA+SCA+DIA+DCA)=hash ('9090'+'123'+'1.1.1.1'+'1.1.1.1'+'134')
2) LRQ: [destinationInfo]='134', (A, J)
2) LCF: [callSignalAddress]='1.1.1.3'
3) ACF: [destCallSignalAddress]='1.1.1.3', (J)
3a) ACF: [destCallSignalAddress]='1.1.1.1', (J)
4) Setup: ASS='1.1.1.10', SAS='123', SCS='1.1.1.10', DAS='134', DCS='1.1.1.1', (J)
5) Setup: ASS='1.1.1.1', SAS='123', SCS='1.1.1.1', DAS='134', DCS=' ', (J)
   verify by Equip.3 that J is registered and recovery of value (A)
   calculate by Equip.3: $J_R$=hash (A+SAS+ASS+SCS+DAS+DCS)=hash ('9090'+'123'+'1.1.1.1'+'1.1.1.1'+'134')
   verify $J_R$=J, therefore send Setup message to called terminal (step 6).
   Note that:
   phase 6 is normally extended by an ARQ/ACF exchange between EP2 and equipment 2 (this phase is not shown here because the process ignores it);
   if the called terminal is not located in the same area as equipment 1, extending call set-up is the responsibility of equipment 3, but this does not change in any way the verify principle.

Figure 16:
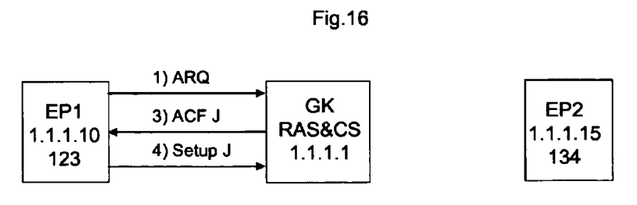
FIGS. 16 to 19 show examples of call set-up detected as fraudulent by the method according to the invention.

FIG. 16 shows a fraudulent call in GKR mode in an AI architecture with an attempt at identity theft by a regular client.

For simplicity, all fraudulent call attempts shown apply to the AI architecture, but these principles are easy to transpose to the AR and AF architectures.

Details:
1) ARQ: ASA='1.1.1.10', SIA='123', SCA='1.1.1.10', DIA='134', DCA=' '
   calculate: J=hash (A+SIA+ASA+SCA+DIA+DCA) hash ('9090'+'123'+'1.1.1.10'+'1.1.1.10'+'134')
3) ACF: [destCallSignalAddress]='1.1.1.1', (J)

4) Setup: ASS='1.1.1.10', SAS='145', SCS='1.1.1.10', DAS='134', DCS=' ', J
   verify by GK that J is registered and recover value A
   calculate: $J_R$=hash (A+SAS+ASS+SCS+DAS+DCS)= hash ('9090'+'145'+'1.1.1.10'+'1.1.1.10'+'134')
   since verification $J_R$=J fails, call is rejected.

Figure 17:
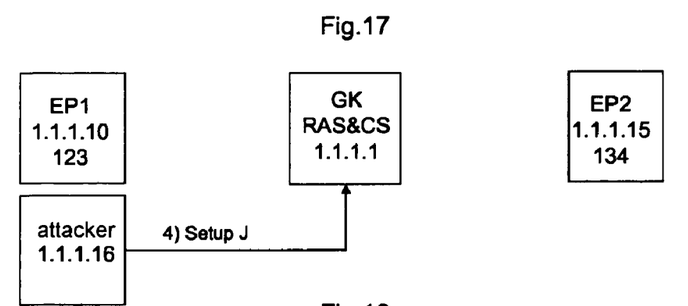

FIG. 17 shows a fraudulent call in GKR mode in an AI architecture with attempted free-of-charge access to the service.

Details:
4) Setup: ASA='1.1.1.16', SAS='123', SCS='1.1.1.16', DAS='134', DCS=' ', (J)
   verify by GK that J is registered in its token base: failure-> call is rejected.

Note that:
   a Setup message with no token also leads to rejection of the call by the GK;
   the calling telephone number can be set to any value and may optionally coincide with a number already stored (identity theft);
   the step of verifying the presence of the token in the base consuming very few resources, the probability of a DOS (Denial of Service) attack by sending a large number of tokens remains low.

Figure 18:
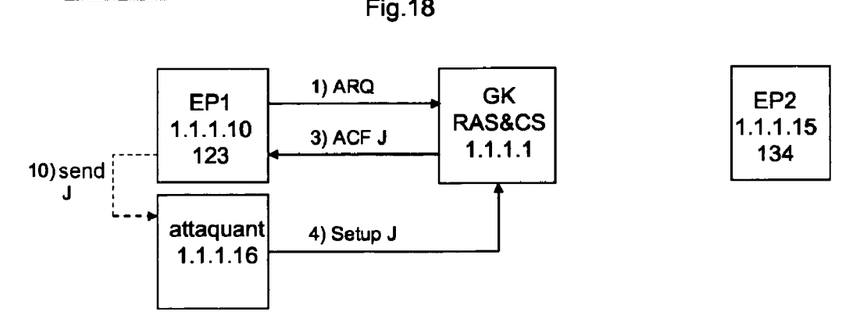

FIG. 18 shows a fraudulent call in GKR mode in an AI architecture with an attempt at free-of-charge access to the service. This example is based on an "ARQ relay" type attack in which the attacker benefits from the complicity of a "corrupted client", i.e. a subscriber to the service capable of reading the H.323 signaling messages that are returned by the network and of communicating certain key information to a non-subscribing Internet user. The attacker generally uses a caller number different from that of the "corrupted client".

Details:
1) ARQ: ASA='1.1.1.10', SIA='123', SCA=' ', DIA='134', DCA=' '
   calculate by GK: J=hash (A+SIA+ASA+SCA+DIA+DCA) hash ('9090'+'123'+'1.1.1.10'+'134')
3) ACF: [destCallSignalAddress]='1.1.1.1', J;
4) Setup: ASS='1.1.1.16', SAS='145', SCS=' ', DAS='134', DCS=' ', J
   verify by GK that J is registered, and recover value A->OK;
   calculate by GK: $J_R$=hash (A+SAS+ASS+SCS+DAS+ DCS)=hash ('9090'+'145'+'1.1.1.16'+'134')
   since verification $J_R$=J fails, call is rejected.

Note that:
   in addition to the information of the token J sent in step 10, the "corrupted client" that has received the ACF message can also transfer other information relating to the call such as the identifiers [callIdentifier], [conferenceID];
   if the attacker were to use the same caller number as the "corrupted client" and steal the source address, token verify would lead to failure anyway because the SCS parameter must be set to point to the attacker.

Figure 19:
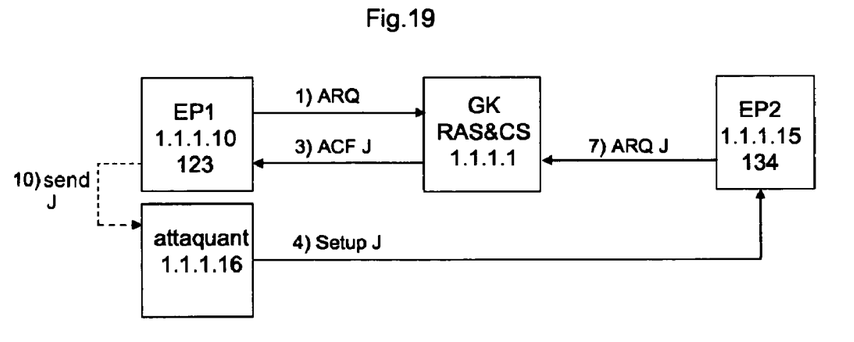

FIG. 19 shows a fraudulent call in GKR mode in an AI architecture attempting free of charge access to the service. This example is based on the same principle as the previous one, but in the case of the direct call set-up mode.

Details:
1) ARQ: ASA='1.1.1.10', SIA='123', SCA=' ', DIA='134', DCA=' '
   calculate (J)=hash (A+SIA+ASA+SCA+DIA+DCA) =hash ('9090'+'123'+'1.1.1.10'+'134')
3) ACF: [destCallSignalAddress]='1.1.1.15', (J)
4) Setup: ASS='1.1.16', SAS='145', SCS=' ', DAS='134', DCS=' ', (J)

7) ARQ: ASS='1.1.1.15', SIA='145', SCA='1.1.1.16', DIA='134', DCA=' ', (J)
   verify by GK that (J) is registered and recover value (A)-> OK
   calculate $(J_R)$=hash (A+SIA+SCA+DIA+DCA)=hash ('9090'+'145'+'1.1.1.16'+'134')
   since verification $(J_R)$=(J) fails, call is rejected.

The invention claimed is:

1. A method of securing a network, to set-up a call to a called endpoint, the method comprising:
   a calling endpoint sending a call set-up message comprising a source information element and a destination information element each having a signaling value that identifies the calling endpoint and the called endpoint, respectively,
   wherein the network sets up said call on condition that both said signaling values correspond to respective admission values previously made known to the network, and
   said admission values previously made known to the network are contained in a token and the network verifies that a first token value sent in the call set-up message corresponds to a second token value given by an equation that includes said source information element and destination information element signaling values and a random information element generated by the network to be associated secretly in the network with the first token value.

2. The method according to claim 1, wherein said first token value is calculated by a registration, admission, and status functional group in a calling end network by means of said equation if said functional group receives from a requesting endpoint an admission request message containing a source information element identifying said requesting endpoint and a destination information element, and said functional group sends the requesting endpoint an admission confirmation message containing said first token value.

3. The method according to claim 1, wherein a call signaling functional group in the network:
   receives the call set-up message;
   verifies that the set-up message contains the first token value and looks for the random information element associated with said first token value, and, if successful:
   calculates the second token value by means of said equation; and
   verifies that said first token value is equal to said second token value.

4. The method according to claim 1, wherein a registration, admission, and status functional group in a called end network:
   receives from the called endpoint an admission request message containing a source information element and a destination information element identifying the called endpoint;
   verifies that the admission request message contains the first token value and looks for the random information element associated with said first token value, and, if successful:
   calculates the second token value by means of said equation; and
   sends an admission confirmation message to the called endpoint on condition that said first token value is equal to said second token value.

5. The method according to claim 1, wherein positive verification of correspondence between the first and second token values has the effect of destroying an association between a random information element and a first token value.

6. The method according to claim 1, wherein said equation includes a hashing function applied to a concatenation of the source information element, the destination information element, and the random information element.

7. A gatekeeper of a network in which to set up a call to a called endpoint a calling endpoint sends the called endpoint a call set-up message including a source information element and a destination information element each having a signaling value that identifies the calling endpoint and the called endpoint, respectively, and comprising a processor adapted to:
 set up said call on condition that both said signaling values correspond to respective admission values previously made known to the network, and
 verify that a first token value sent in the call set-up message matches to a second token value given by an equation that includes said source information element and destination information element signaling values and a random information element generated by the network to be associated secretly in the network with the first token value.

8. The gatekeeper according to claim 7, comprising a registration, admission, and status (RAS) functional group adapted to receive an admission request message from a sender endpoint, to extract from said request message a destination information element and a source information element identifying said sender endpoint, to calculate said first token value by means of said equation, and to send the sender endpoint an admission confirmation message containing said first token value.

9. The gatekeeper according to claim 7, comprising a call signaling (CS) functional group adapted to receive the call set-up message, to verify that the set-up message contains the first token value and to look for the random information element associated with said first token value, if successful to calculate the second token value by means of said equation, and to verify that said first token value is equal to said second token value.

10. The gatekeeper according to claim 7, comprising a registration, admission, and status functional group adapted to receive from the called endpoint an admission request message including a source information element and a destination information element identifying the called endpoint, to verify that the admission request message contains the first token value and to look for the random information element associated with said first token value to calculate, if successful, the second token value by means of said equation, and to send an admission confirmation message to the called endpoint on condition that said first token value is equal to said second token value.

11. The gatekeeper according to claim 7, adapted to destroy an association between the random information element and the first token value after positive verification of a match between the first and second token values.

12. The gatekeeper according to claim 7, wherein said equation includes a hashing function applied to a concatenation of the source information element, the destination information element, and the random information element.

* * * * *